(12) United States Patent
Bejerano

(10) Patent No.: US 8,861,352 B2
(45) Date of Patent: Oct. 14, 2014

(54) DYNAMIC DELAY BUDGET ALLOCATION USING SINGLE-POINT ESTIMATION OF END-TO-END DELAY

(75) Inventor: Yigal Bejerano, Springfield, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1083 days.

(21) Appl. No.: 12/802,088

(22) Filed: May 28, 2010

(65) Prior Publication Data
US 2011/0292797 A1    Dec. 1, 2011

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 29/06* | (2006.01) |
| *H04L 12/66* | (2006.01) |

(52) U.S. Cl.
CPC ............ *H04L 12/66* (2013.01); *H04L 65/1053* (2013.01); *H04L 65/80* (2013.01); *H04L 43/106* (2013.01); *H04L 43/0852* (2013.01)

USPC ........ 370/230.1; 370/229; 370/230; 370/231; 370/232; 370/233; 370/234; 370/235; 370/236; 370/237; 370/238; 370/239; 370/240

(58) Field of Classification Search
None
See application file for complete search history.

(56) References Cited

U.S. PATENT DOCUMENTS

| | | | |
|---|---|---|---|
| 7,012,982 B1 * | 3/2006 | Basch et al. .................. | 375/371 |
| 2006/0268713 A1 * | 11/2006 | Lundstrom .................... | 370/235 |
| 2007/0171878 A1 * | 7/2007 | Souissi et al. ................. | 370/338 |

* cited by examiner

*Primary Examiner* — Hassan Phillips
*Assistant Examiner* — Lonnie Sweet
(74) *Attorney, Agent, or Firm* — Hitt Gaines, PC

(57) ABSTRACT

A computer-readable medium has tangibly embodied thereon and accessible therefrom a set of instructions interpretable by at least one data processing device. The set of instructions is configured for causing the at least one data processing device to carry out operations for estimating a delay for each one of a plurality of packets of a VOIP traffic flow and for allocating a delay budget for each one of the packets dependent upon the estimated delay thereof. Such estimating is performed at a fixed location between end locations of a path over which the packets traverse and is performed using packet timestamp information acquired from the packets only at the fixed location.

17 Claims, 2 Drawing Sheets

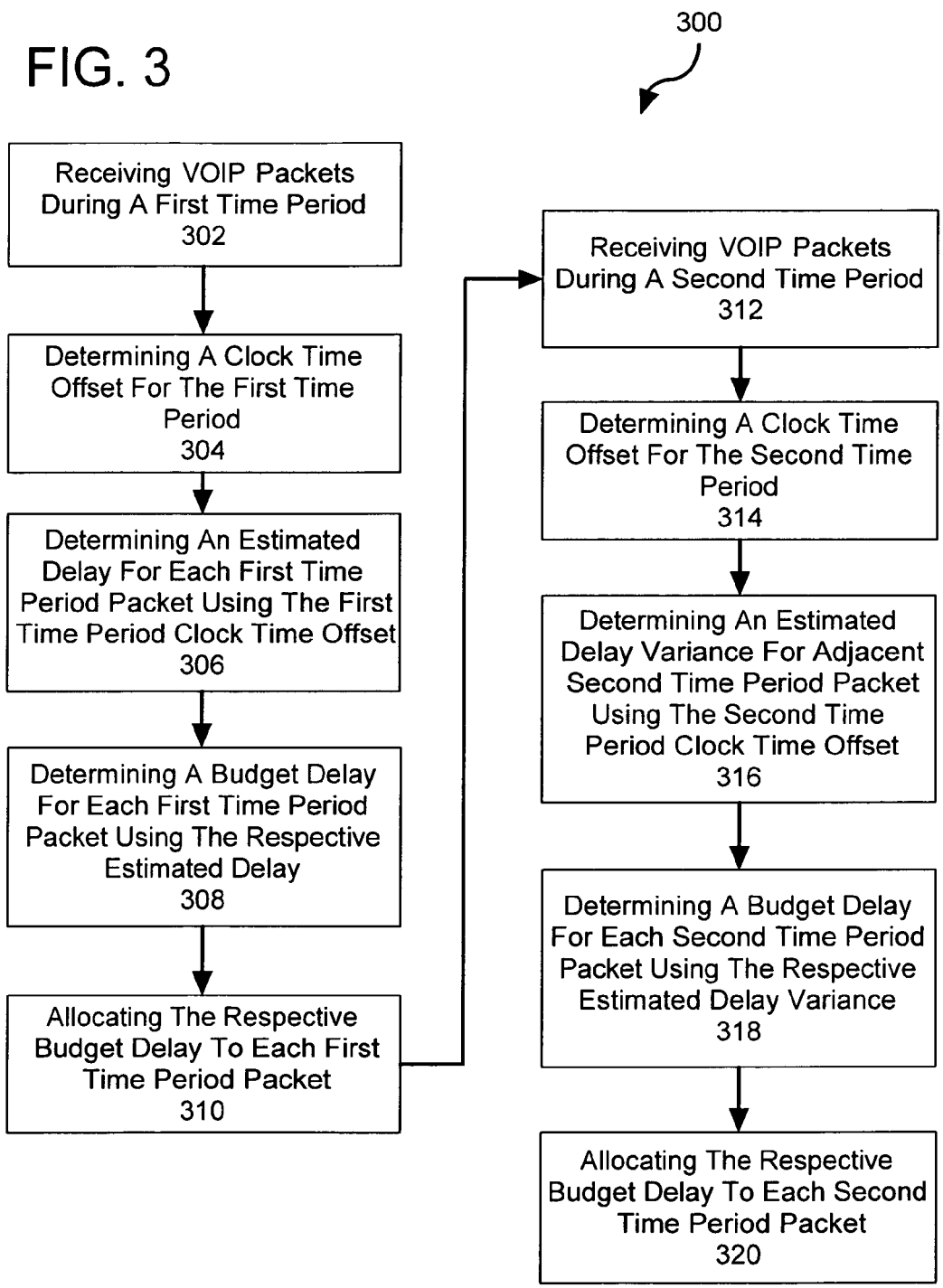

DYNAMIC DELAY BUDGET ALLOCATION USING SINGLE-POINT ESTIMATION OF END-TO-END DELAY

FIELD OF THE DISCLOSURE

The disclosures made herein relate generally to telecommunication network systems and, more particularly, to delay budget allocation for VOIP packets in a telecommunication network system.

BACKGROUND

A voice over Internet Protocol (VoIP) connection is a real-time application that is sensitive to delay and jitter. To ensure high mean opinion score (MOS) of every VoIP connection, third-generation (3G) and fourth-generation (4G) telecommunications standards currently suggest allocating a fixed delay budget (e.g., preferably in the range of 50-100 ms, but not more than 200 ms) to any incoming VoIP packet that arrives at a radio access network (RAN) of a receiver. High-Speed Downlink Packet Access (HSPDA), High Speed Packet Access (HSPA) and Long Term Evolution (LTE) are examples of technology standards and/or protocols upon which such 3G/4G telecommunication network systems are implemented. To meet this fixed delay budget objective, the end-to-end path between the end-users is divided into segments that contain the RAN (radio access network) of the sender, the core IP network and the receiver RAN. For each one of these three segments, a fixed budget delay is allocated that provides an upper bound on the delay of a voice packet in each segment. Typically, the delay budgets of the RANs is between about 50 to 80 ms and about 50 ms for the core network.

Because VoIP packets can have different delay until they arrive at the receiver RAN, an alternate approach to allocating a fixed delay budget includes allocating a delay budget to each VoIP packet that is inversely proportional to the delay that the packet has already experienced in its path. A problem with this approach is that the packet delay from its originating node to the receiver RAN is unknown. One possible solution for overcoming this problem is to deploy a monitoring system that will monitor the end-to-end delay and jitter between the VoIP source node (or a node close to the source node) and the receiver RAN (e.g., a P-gateway at Long Term Evolution (LTE) networks). However, such a solution can be difficult to implement because source and the destination RANs are often managed and/or owned by different network provider entities.

In IP based 3G and 4G cellular systems, voice information is encapsulated into voice over IP (VoIP) packets and each packet is sent as an independent IP packet. In such network systems, the delay of a packet is variable and is composed of fixed and dynamic delay components. The fixed delay component results from physical constraints such as voice decoding/encoding and the propagation delay on the air and the wires. This fixed delay component is typically very small and even in the case of long distance calls (e.g., from end-to-end in USA) it is typical no more than about 30 to 40 ms. The dynamic delay component results from retransmissions (e.g., via the usage of Hybrid automatic repeat request (HARQ) mechanism) and buffering delay. This dynamic delay component is typically much more substantial than the fixed delay component.

In current implementations of delay budget allocation, a fixed delay budget is allocated to every segment along the end-to-end path to overcome the delay variability. While it is easy to implement delay budget allocation in this manner, it posses a stringent per-segment delay constraint that does not take advantages of the delay variability on a per-segment basis. Another approach for implementing delay budget allocation in a manner that takes into account the delay variability of the VoIP traffic is to allocate a dynamic delay budget to each VoIP packet at the receiver RAN based on the delay that it experienced so far. The additional delay can be used for improving the voice quality of the receiver (e.g., by allowing more HARQ retransmissions), for increasing the system capacity (e.g., by giving the RAN more flexibility to send the VoIP packets when the channel quality is good), and/or for improving voice capacity of the cells. A known problem of dynamic delay budget allocation for VoIP packets at the receiver RAN is the lack of knowledge of the packet delay before it reaches the receiver RAN. Although each VoIP packet carries a time stamp in which it was generated, this time stamp refers to an arbitrary clock at the sender side and not to a global clock. Moreover, deploying an end-to-end monitoring system in most cases in unfeasible as the sender and receiver RANs are often managed by different authorities.

SUMMARY OF THE DISCLOSURE

Embodiment of the present invention allow for dynamic allocation of delay budget to be implemented in a manner that is practical and feasible. More specifically, embodiment of the present invention provide for evaluating the end-to-end delay of VoIP traffic by monitoring the performance of a VOIP traffic flow from a single point and for using this estimated end-to-end delay in allocating delay budget for VoIP packets. Because the channel condition between the mobile users and the base stations change frequently, a key objective of embodiments of the present invention is to enable adaptive evaluation of the delay estimation by dynamically modifying packet timestamp information in time to accommodate the changes of the end-to-end delay.

In accordance with the present invention, monitoring the performance of a VOIP traffic flow from a single point can be implemented by estimating the end-to-end delay of a packet by observing the delay variation of a given VOIP traffic flow at a single point (e.g., a packet gateway). To this end, embodiments of the present invention rely upon the observation that most of a packet's delay results from buffering delay or packet retransmissions by the data-link layer (e.g HARQ retransmissions). Because buffering delay is time varying, VOIP traffic flow with high delay suffers from high delay variability (e.g., high jitter). Thus, embodiments of the present invention utilize the delay variation of a VOIP traffic flow for evaluating the packets' delay and to allocate delay budgets. Advantageously, such single-point estimation of end-to-end delay provides a good approximation of the packet delay without any collaboration or additional information from other nodes in the network. By allowing budget delay to be implemented in this manner, embodiments of the present invention provide for enhanced network capacity and voice quality.

In one embodiment of the present invention, a method comprises at least one data processing device accessing, from memory coupled to the at least one data processing device, instructions causing the at least one data processing device to estimate a delay for each one of a plurality of packets of a VOIP traffic flow and to allocate a delay budget to each one of the packets dependent upon the estimated delay thereof. Causing the at least one data processing device to estimate the delay is performed at a fixed location between end locations of a path over which the packets traverse and is performed using packet timestamp information acquired from the packets only at the fixed location.

In another embodiment of the present invention, a packet monitoring apparatus is configured for being located within a traffic transmission path of a VOIP traffic flow. The packet monitoring apparatus comprises at least one data processing device, instructions processable by the at least one data processing device, and an apparatus from which the instructions are accessible by the at least one data processing device. The instructions are configured for causing the at least one data processing device to determine a clock time offset for packets of the VOIP traffic flow received by the packet monitoring apparatus during a first time period, determine an estimated delay time of each one of the first time period packets, and determine a delay budget for each one of the first time period packets. The clock time offset is derived from a difference between a prescribed minimum delay time and a randomized delay time for one of the first time period packets identified as having a minimum delay time of all of the first time period packets. The randomized delay time of the minimum delay first time period packet is derived from a difference between a time at which the minimum delay first time period packet is received by the packet monitoring apparatus and a time represented by a time stamp issued to the minimum delay first time period packet by a timestamp clock during generation of the minimum delay first time period packet. The estimated delay time of a particular one of the first time period packets is derived from a difference between a randomized delay time for the particular one of the first time period packets and the clock time offset. The randomized delay time of the particular one of the first time period packets is derived from a difference between a time at which the particular one of the first time period packets is received by the packet monitoring apparatus and a time represented by a time stamp issued to the particular one of the first time period packets by the timestamp clock during generation of the particular one of the first time period packets. The delay budget for each one of the first time period packets is derived from a difference between a prescribed delay time and the estimated delay time thereof.

In another embodiment of the present invention, a computer-readable medium has tangibly embodied thereon and accessible therefrom a set of instructions interpretable by at least one data processing device. The set of instructions is configured for causing the at least one data processing device to carry out operations for estimating a delay for each one of a plurality of packets of a VOIP traffic flow and for allocating a delay budget to each one of the packets dependent upon the estimated delay thereof. Such estimating is performed at a fixed location between end locations of a path over which the packets traverse and is performed using packet timestamp information acquired from the packets only at the fixed location.

These and other objects, embodiments, advantages and/or distinctions of the present invention will become readily apparent upon further review of the following specification, associated drawings and appended claims.

BRIEF DESCRIPTION OF THE DRAWINGS

FIG. 3 is a flow chart showing a method for dynamically allocating delay budget in accordance with an embodiment of the present invention.

DETAILED DESCRIPTION OF THE DRAWING FIGURES

Embodiments of the present invention provide for dynamically allocating delay budget by estimating the end-to-end delay from a single measurement point. This measurement point is the point at which traffic flow data used in deriving budget delay is collected. Dynamically allocating delay budget in this manner relies upon real-time evaluation of end-to-end delay of each packet in a VOIP packet flow and thereafter allocating a delay budget for every packet k based on the estimated end-to-end delay of the packet up to a particular point in time (e.g., a current point in time). An apparatus or system configured in accordance with an embodiment of the present invention for dynamically allocating delay budget can be integrated within or coupled to various components of a Radio Access Network (RAN). For example, in a LTE network, a suitable locations for such an apparatus or system include but are not limited to, a base transceiver station (e.g., an e-node-B of the network), a Packet Gateway Network (PDN) gateway (P-GW), and a servicing gateway (S-GW).

Presented now is a discussion relating to implementation of dynamically allocating delay budget in accordance with the present invention. A VoIP traffic flow (i.e., packet flow) from a sender S to a receiver R traverses through a monitoring station M. The maximal delay that any VoIP packet k can encounter is denoted as Dmax and the delay that packet k experiences along the path from S to M is denoted as $D\_SM(k)$. An objective of the present invention is to estimate $D\_SM(k)$ as accurately as possible by passive monitoring of the VoIP traffic flow from S to M and, thereafter, to allocate a delay budget DB(k) to packet k. The delay budget DB(k) is derived to be as close as possible to the difference between the maximal delay Dmax and the experienced delay $D\_SM(k)$.

Implementing dynamic allocation of delay budget in accordance with the present invention is based on two basic observations. The first of these two basic observations is that, during a long enough VoIP traffic flow, some of the packets suffer from minimal or close to minimal possible delay, which is denoted herein as Dmin. The second of these two basic observations is that there is a correlation between the average end-to-end delay of a given VoIP traffic flow and the delay variability (jitter) observed at its measurement point.

Figure 1:
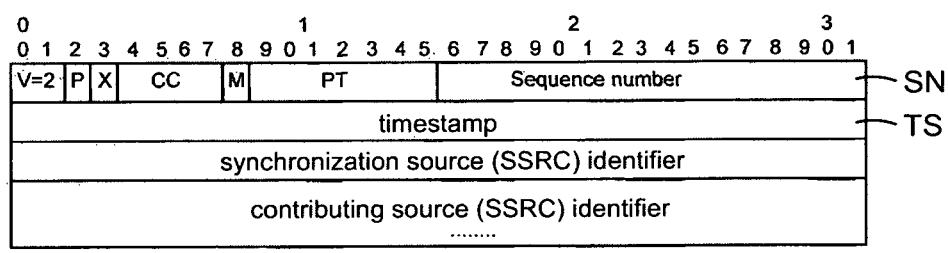
FIG. 1 shows a header for a RTP data packet for a RTP/IP frame.

In a preferred embodiment of the present invention, VoIP traffic flow is not encrypted and it is carried by Real-time Transport Protocol (RTP)/Internet Protocol (IP) frames. Thus, the monitoring station M can decode the Real-time Transport Protocol (RTP) header of each VoIP packet. FIG. 1 shows the header for a RTP data packet for a RTP/IP frame (i.e., RTP header 100). The fields of the RTP header 100 that are relevant to dynamic allocation of delay budget in accordance with the present invention include sequence number SN (i.e., RTP header sequence number) and timestamp TS (i.e., RTP header timestamp). The sequence number SN increments by one for each RTP data packet sent and can be used by a RAN receiver to detect packet loss and to restore packet sequence. The timestamp TS reflects the sampling instant by the RTP clock of the first octet in the RTP data packet. The sampling instant is derived from a clock that increments monotonically and linearly in time to allow synchronization and jitter calculations. It is important to note that the initial values of the sequence number and the timestamp are random for security reasons (e.g., to make known-plaintext attacks on encryption more difficult).

Fields of the RTP header 100 can be used for detecting packet loss and jitter (i.e., delay variability). However, it cannot be used for calculating the end-to-end delay from the sender to the monitoring node, because the clock that is used for generating the timestamps of the RTP packets is initialized with a random value. Because the SN is increased by one for each transmitted RTP packet, any missing sequence number indicates a lost packet (i.e., packet loss). Jitter defines the variability in packet latency. Jitter can be calculated from arrival time of packets at the monitoring station and the timestamp of the RTP packets. For example, consider an RTP packet designated at RTP packet (k). Variables associated with RTP packet (k) include an arrival time of packet (k) to the monitoring station (i.e., arrival time A(k)) and a timestamp carried by RTP packet (k) (i.e., timestamp TS(k)). Using these variables, jitter between packets k−1 and k is: Jitter(k)=[A(k)−TS(k)]−[A(k−1)−TS(k−1)]. As such it is important to note that jitter between two successive packets can be calculated even without knowing their delays.

Because the RTP clock used for the issuing each RTP timestamps is initialized to a random value the RTP timestamps cannot be used directly for evaluating the packets' delay. However, embodiments of the present invention overcome this limitation by relying upon the above-mentioned observation that, during a long enough RTP flow, some of the packets suffer from minimal or close to minimal possible delay Dmin. To this end, the time difference between the RTP clock time and the actual clock time (i.e., non-randomized/global clock time) is denoted as clock time offset GAP (i.e., a time difference).

Figure 2:
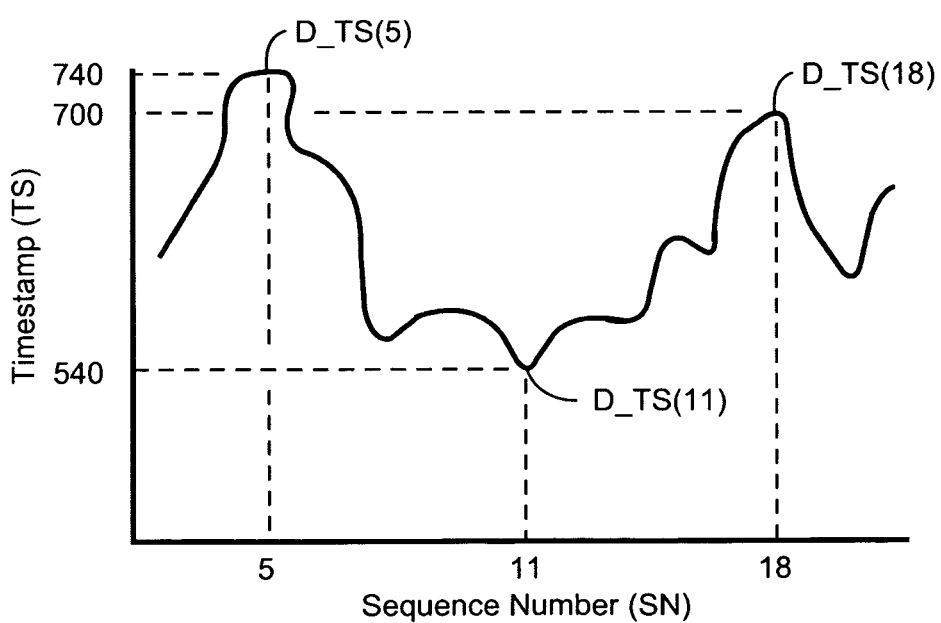
FIG. 2 is a diagrammatic view showing timestamps of RTP data packets as a function of their sequence numbers.

For a long RTP traffic flow, this first observation indicates that the RTP packet that suffers from the smallest delay can be used to estimate the clock time offset GAP of the timestamp fields (i.e., timestamp TS). More specific, RTP packet (n) is designated as being the RTP packet with the minimal packet delay D_TS(n) where D_TS(n)=A(n)−TS(n). D_TS(n) is also referred to herein as a randomized delay time as a result of the initial values of the sequence number and the timestamp being random, as is disclosed above. In view of this first observation, RTP packet (n) suffers a near minimal delay of Dmin and, thus, the clock time offset GAP between the random clock that is used for generating the RTP packets and the real packet creation time can be calculated by: GAP=A(n)−TS(n)−Dmin=D_TSmin−Dmin. Based on this calculation, it can be seen that the estimated delay of each RTP packet (k) in the RTP flow is: Delay(k)=A(k)−TS(k)−GAP. An example of this computing approach is illustrated in FIG. 2. Graph 200 indicates that RTP packet 11 (i.e., sequence no. 11) suffers the minimal delay and has a timestamp (TS) of 540 (i.e., TS(11)=D_TSmin=540). Where it is given that the actual minimal delay (i.e., prescribed minimum fixed delay) should be 40 ms, it is concluded that the time offset GAP is 500.

As disclosed above, the second observation upon which dynamic allocation of delay budget in accordance with the present invention is based is that there is a correlation between the average end-to-end delay of a given RTP traffic flow and the delay variability (jitter) observed at the measurement point. In general, a significant portion of end-to-end delay for an RTP packet results from a dynamic delay component, which depends on the temporal situation of the network (e.g. the channel condition between the sender and the base station as well as the load on the networking elements (routers and gateways) along the packet path). When RTP traffic flow suffers from high delay variability, this implies that either the sender retransmits a plurality of VoIP packets multiple times (e.g., by using the HARQ retransmission mechanism), that the network elements along the path suffer from high load and as a results the flow suffer from high buffering delay, or both. In such a situation, it is expected that the fixed delay is higher (e.g., due to large number of network elements along the path) and/or that even the packet(s) that suffer the minimal delay (e.g., as calculated above) can experience delay higher than the prescribed minimal fixed delay. This impacts the value of Dmin that is used for evaluating the fixed delay.

A mechanism for implementing dynamic allocation of delay budget in accordance with the present invention includes two components, which can be implemented in the form of a method, an apparatus, system, and/or computer-readable medium. A first one of these components is configured for evaluating an end-to-end delay of each packet of a VOIP traffic flow. A second one of these components is configured for allocating a delay budget for every packet based on the estimated end-to-end delay received within a prescribed period of time. The delay budget is calculated as: Delay_Budget=Max_Delay−Estimated_Delay (i.e., DB(k)=Dmax−Estimated D_SM(k)). Max_Delay (i.e., Dmax) is a configuration (e.g., administrator or system prescribed) parameter that specifies a bound on a desired packet delay. It is disclosed herein that the mechanism for implementing dynamic allocation of delay budget can be embodied as a standalone packet monitoring apparatus or system or as a packet monitoring apparatus or system integrated into a network element.

Presented now is a preferred embodiment of an approach for estimating the estimated delay D_SM(k) of RTP packet (k) between a sender S and monitoring station M. Because the channel condition between mobile users and their base stations change frequently, a key objective of embodiments of the present invention is to enable adaptive evaluation of the delay estimation (i.e., dynamically allocating delay budget). For evaluating the delay, evaluation of clock time offset GAP and delay variability is preferably dynamically modified as a function of time in order to accommodate changes that influence the end-to-end delay.

During a first time period (e.g., an initial time period), the mechanism for implementing dynamic allocation of delay budget assumes a high delay for the packet flow and allocate a low delay budget DBmin to each packet, where DBmin is the minimal delay budget allocated to a packet. Simultaneously the mechanism evaluates the delay variability of the first time period packets and the minimal TS delay (D_TSmin) for evaluating the time offset GAP between the RTP reference clock and the actual packet creation time. Delay variance can be used to represent delay variability in view of the fact that delay variance is the same as the jitter variance and can be calculated as: delay_var=E[(Jitter−mean-jitter)]^2]=Delay_var(k)=E[Jitter^2]−[mean-jitter]^2.

A voice portion of VOIP traffic flow typically contains 50 voice samples in a second. Thus, after 2-3 second following first time period (i.e., no in a second time period), the mechanism for implementing dynamic allocation of delay budget has enough samples for evaluating Delay_var and D_TSmin. However, because the delay characteristic can change in time, it is beneficial to calculate a geometric average that gives higher importance to samples later in the time period. To this end, in a preferred embodiment, mean_jitter(k) is the geometric average of the jitter up to sample k such that mean_jitter(0) is an initial high value (i.e., for allocating conservative delay budget at the beginning of the RPT traffic flow) and mean_jitter(k)=(1−a) Mean_jitter(k−1)+a jitter(k), where 0<a<1 is the parameter of the geometric average. For the delay variance, the geometric second moment of the jitter is calculated in accordance with: $E(jitter(0)^2)=0$ and $E(Jitter(k)^2)=a^2*E(jitter(k-1)^2)+(1-a)^2*jitter(k)$. Consequently, the delay variance until RTP packet (k) is calculated as follows: $delay\_var(k)=E[(Jitter(k))^2]-[mean\text{-}jitter(k)]^2$. For calculation of D_Tsmin during a given time period after the initial (e.g., first) time period, a geometric averaging technique is used; As disclosed above, during a first time period, the mechanism for implementing dynamic allocation of delay budget system calculates the minimal estimated delay as: $D\_TS[k]=A[k]-TS[k]$. After the first time period, the system provides for: $D\_TSmin=new\_D\_Tsmin$. For each successive time period T, D_TSmin is modified as follows: $D\_TSmin=(1-b)*D\_TSmim+b*new\_D\_Tsmin$, where $0<b<1$ is the parameter of the geometric average. Accordingly, through calculation of delay variance and estimated delay in this manner, embodiments of the present invention allow for implementation of dynamically allocating delay budget as a function of time.

Turning now to FIG. 3, a method 300 for dynamically allocating delay budget as a function of time in accordance with an embodiment of the present invention is disclosed. The method 300 can be carried out by a suitable packet monitoring apparatus or system. In one embodiment, the suitable packet monitoring apparatus or system is integrated within or coupled to one or more components of a Radio Access Network (RAN) at a fixed (i.e., single) location within the network (i.e., an apparatus or system owned and/or managed by a single entity). A key aspect of the present invention is that computation of the delay budget is performed using packet timestamp information acquired from packets only at the fixed location.

An operation 302 is performed for receiving packets of a VOIP traffic flow during a first time period. Concurrent with or after receiving such first time period packets, an operation 304 is performed for determine a clock time offset for packets of the VOIP traffic flow received by the packet monitoring apparatus during the first time period. In one embodiment, the clock time offset can be derived from a difference between a prescribed minimum delay time and a randomized delay time for one of the first time period packets identified as having a minimum delay time of all of the first time period packets. In one embodiment, the randomized delay time of the minimum delay first time period packet can be derived from a difference between a time at which the minimum delay first time period packet is received by the packet monitoring apparatus and a time represented by a time stamp issued to the minimum delay first time period packet by a timestamp clock during generation of the minimum delay first time period packet. The timestamp clock is initiated at a randomized time and thus the resulting randomized delay times derived from time stamps issued by the timestamp clock. After determining the clock time offset, an operation 306 is performed for determining an estimated delay time of each one of the first time period packets. The estimated delay time of a particular one of the first time period packets is derived from a difference between a randomized delay time for the particular one of the first time period packets and the clock time offset. The randomized delay time of the particular one of the first time period packets is derived from a difference between a time at which the particular one of the first time period packets is received by the packet monitoring apparatus and a time represented by a time stamp issued to the particular one of the first time period packets by the timestamp clock during generation of the particular one of the first time period packets. An operation 308 is then performed for determining a delay budget for each one of the first time period packets, followed by an operation 310 being performed for allocating the respective budget delay time to each one of the first time period packets. The delay budget for each one of the first time period packets is derived from a difference between a prescribed delay time (e.g., a maximum delay time) and the estimated delay time thereof.

After the first time period has elapsed, an operation 312 is performed for receiving packets of the VOIP traffic flow during a second time period. Concurrent with or after receiving such second time period packets, an operation 314 is performed for determining a new clock time offset for packets of the VOIP traffic flow received by the packet monitoring apparatus during the second time period. The new clock time offset is derived in the same manner as disclosed above in reference to operation 304. After determining the new clock time offset, an operation 316 is performed for determining a delay variance between adjacently received ones of the second time period packets. In one embodiment, the delay variance for adjacently received ones of the second time period packets is derived using jitter therebetween and a mean jitter thereof. Thereafter, an operation 318 is performed for determining a delay budget for each one of the second time period packets using the respective delay variance thereof, followed by an operation 320 being performed for allocating the respective budget delay time to each one of the second time period packets. In one embodiment of the present invention, the new time clock offset and the delay variance are derived using the geometric averaging techniques disclosed above.

Referring now to computer readable medium, it will be understood from the inventive disclosures made herein that methods, processes and/or operations adapted for carrying out dynamic allocation of delay budget as a function of time are tangibly embodied by computer readable medium having instructions thereon for carrying out such functionality. In one specific embodiment, the instructions are tangibly embodied for carrying out the method of dynamic allocation of delay budget as a function of time. The instructions can be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the inventive disclosures made herein include a compact disk, a hard drive, RAM or other type of storage apparatus that has imaged thereon a computer program (i.e., a set of instructions) adapted for carrying out dynamic allocation of delay budget as a function of time in accordance with the inventive disclosures made herein.

In the preceding detailed description, reference has been made to the accompanying drawings that form a part hereof, and in which are shown by way of illustration specific embodiments in which the present invention can be practiced. These embodiments, and certain variants thereof, have been described in sufficient detail to enable those skilled in the art to practice embodiments of the present invention. It is to be understood that other suitable embodiments can be utilized and that logical, mechanical, chemical and electrical changes can be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method, comprising:

at least one data processing device accessing, from memory coupled to said at least one data processing device, instructions causing said at least one data processing device to estimate a delay for each one of a plurality of packets of a computer network traffic flow, wherein causing said at least one data processing device to estimate the delay:

is performed at a fixed location between end locations of a path over which said packets traverse;

is performed using packet timestamp information acquired from said packets only at the fixed location and based on a minimum delay of all of said packets received at said fixed location; and includes causing said at least one data processing device to determine a clock time offset for packets of the computer network traffic flow and determining an estimated delay time of each one of said packets wherein:

the clock time offset is derived from a difference between a minimum delay time and a randomized delay time for one of said packets identified as having a minimum delay time of all of said packets; and the randomized delay time of said minimum delay packet is derived from a difference between a time at which said minimum delay packet is received by the packet monitoring apparatus and a time represented by a time stamp issued to said minimum delay packet by a timestamp clock during generation of said minimum delay packet; and said at least one data processing device accessing, from said memory, instructions causing said at least one data processing device to allocate a delay budget to each one of said packets dependent upon the estimated delay thereof.

2. The method of claim 1 wherein the estimated end-to-end delay of a particular one of said packets is derived from a difference between a randomized delay time for the particular one of said packets and the clock time offset.

3. The method of claim 2 wherein the randomized delay time of the particular one of said packets is derived from a difference between a time at which the particular one of said packets is received by the packet monitoring apparatus and a time represented by a time stamp issued to the particular one of said packets by the timestamp clock during generation of the particular one of said packets.

4. The method of claim 3 wherein the clock time offset is derived from a difference between a minimum delay time and a randomized delay time for one of said packets identified as having a minimum delay time of all of said packets.

5. The method of claim 1 wherein the delay budget of a particular one of said packets is derived from a difference between a maximum delay time and the estimated delay time of the particular one of said packets.

6. The method of claim 5 causing said at least one data processing device to estimate the delay for each one of the plurality of packets includes causing said at least one data processing device to determine a clock time offset for packets of the computer network traffic flow and determine an estimated delay time of each one of said packets.

7. The method of claim 6 wherein:

the clock time offset is derived from a difference between a minimum delay time and a randomized delay time for one of said packets identified as having a minimum delay time of all of said packets;

the estimated delay of a particular one of said packets is derived from a difference between a randomized delay time for the particular one of said packets and the clock time offset; and the randomized delay time of the particular one of said packets is derived from a difference between a time at which the particular one of said packets is received by the packet monitoring apparatus and a time represented by a time stamp issued to the particular one of said packets by the timestamp clock during generation of the particular one of said packets.

8. A packet monitoring apparatus configured for being located within a traffic transmission path of a Voice Over Internet Protocol (VOIP) traffic flow, comprising:

at least one data processing device;

instructions processable by said at least one data processing device; and an apparatus from which said instructions are accessible by said at least one data processing device;

wherein said instructions are configured for causing said at least one data processing device to:

determine a clock time offset for packets of the VOIP traffic flow received by the packet monitoring apparatus during a first time period, wherein:

the clock time offset is derived from a difference between a prescribed minimum delay time and a randomized delay time for one of said first time period packets identified as having a minimum delay time of all of said first time period packets; and the randomized delay time of said minimum delay first time period packet is derived from a difference between a time at which said minimum delay first time period packet is received by the packet monitoring apparatus and a time represented by a time stamp issued to said minimum delay first time period packet by a timestamp clock during generation of said minimum delay first time period packet;

determine an estimated delay time of each one of said first time period packets, wherein:

the estimated delay time of a particular one of said first time period packets is derived from a difference between a randomized delay time for the particular one of said first time period packets and the clock time offset; and the randomized delay time of the particular one of said first time period packets is derived from a difference between a time at which the particular one of said first time period packets is received by the packet monitoring apparatus and a time represented by a time stamp issued to the particular one of said first time period packets by the timestamp clock during generation of the particular one of said first time period packets; and determine a delay budget for each one of said first time period packets, wherein the delay budget for each one of said first time period packets is derived from a difference between a prescribed delay time and the estimated delay time thereof.

9. The packet monitoring apparatus of claim 8 wherein the prescribed delay time is a maximum delay time.

10. The packet monitoring apparatus of claim 8 wherein causing said at least one data processing device to determine the clock time offset is derived from causing said at least one data processing device to decode a Real-time Transport Protocol (RTP) header of at least one of said packets.

11. The packet monitoring apparatus of claim 8 wherein said instructions are further configured for causing said at least one data processing device to:
  determine a randomized delay time for each one of a plurality of packets of the VOIP traffic flow received by the packet monitoring apparatus during a second time period;
  determine one of said each one of a plurality of packets during said second time period packets having a minimum randomized delay time thereby providing a randomized delay time of said one second time period packet having a minimum randomized delay time;
  determine a new clock time offset, wherein the new clock time offset is derived from a difference between the prescribed minimum delay time and the randomized delay time of said one second time period packet having a minimum randomized delay time;
  determine a delay variance between adjacently received ones of said second time period packets; and
  determine a delay budget for each one of said second time period packets, wherein the delay budget for each one of said first time period packets is derived using the delay variance thereof.

12. The packet monitoring apparatus of claim 11 wherein the delay variance for adjacently received ones of said second time period packets is derived using jitter therebetween and a mean jitter thereof.

13. The packet monitoring apparatus of claim 12 wherein the mean jitter of each one of said second time period packets is a geometric average of the jitter thereof.

14. A non-transitory computer-readable medium having tangibly embodied thereon and accessible therefrom a set of instructions interpretable by at least one data processing device, said set of instructions configured for causing said at least one data processing device to carry out operations for:
  estimating a delay for each one of a plurality of packets of a Voice Over Internet Protocol (VOIP) traffic flow, wherein said estimating is performed at a fixed location between end locations of a path over which said packets traverse and is performed using packet timestamp information acquired from said packets only at the fixed location and based on a minimum delay of all of said packets received at said fixed location; and
  allocating a delay budget to each one of said packets dependent upon the estimated delay thereof; wherein
    estimating the delay for each one of the plurality of packets includes determining a clock time offset for packets of the VOIP traffic flow and determine an estimated delay time of each one of said packets;
    the clock time offset is derived from a difference between a minimum delay time and a randomized delay time for one of said packets identified as having a minimum delay time of all of said packets; and
    the randomized delay time of said minimum delay packet is derived from a difference between a time at which said minimum delay packet is received by the packet monitoring apparatus and a time represented by a time stamp issued to said minimum delay packet by a timestamp clock during generation of said minimum delay packet.

15. The computer-readable medium of claim 14 wherein:
  the estimated end-to-end delay of a particular one of said packets is derived from a difference between a randomized delay time for the particular one of said packets and the clock time offset; and
  the randomized delay time of the particular one of said packets is derived from a difference between a time at which the particular one of said packets is received by the packet monitoring apparatus and a time represented by a time stamp issued to the particular one of said packets by the timestamp clock during generation of the particular one of said packets.

16. The computer-readable medium of claim 14 wherein the delay budget of a particular one of said packets is derived from a difference between a maximum delay time and the estimated delay time of the particular one of said packets.

17. The computer-readable medium of claim 14 wherein:
  estimating the delay for each one of the plurality of packets includes determining a clock time offset for packets of the VOIP traffic flow and determine an estimated delay time of each one of said packets;
  the clock time offset is derived from a difference between a minimum delay time and a randomized delay time for one of said packets identified as having a minimum delay time of all of said packets;
  the estimated delay of a particular one of said packets is derived from a difference between a randomized delay time for the particular one of said packets and the clock time offset; and
  the randomized delay time of the particular one of said packets is derived from a difference between a time at which the particular one of said packets is received by the packet monitoring apparatus and a time represented by a time stamp issued to the particular one of said packets by the timestamp clock during generation of the particular one of said packets.

* * * * *